9746X
I. Dunham.
Lamp.
Patented Jun. 20, 1836.
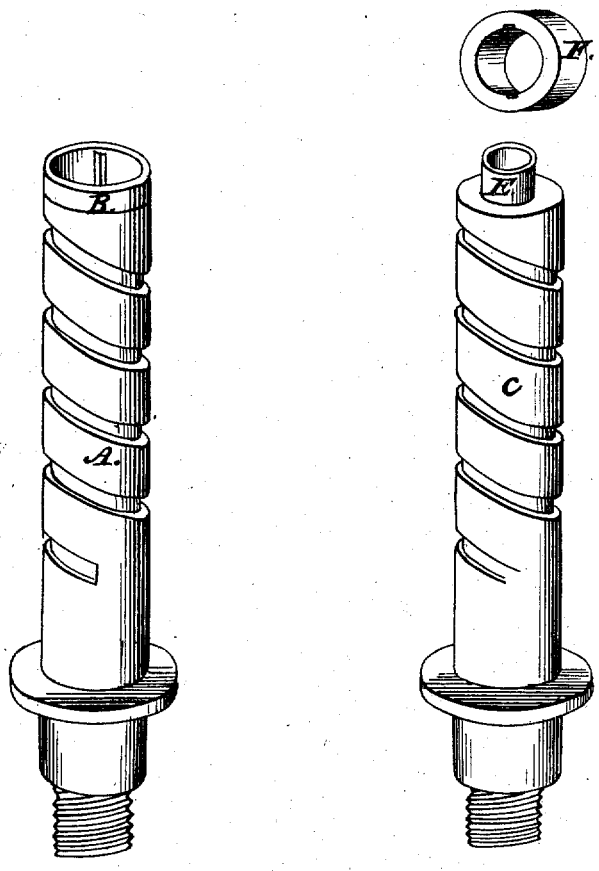

6/20/1836 9746X

June 20. 1836

Isaac Dunham

[illegible]

The schedule referred to in these Letters Patent and
making part of the same containing a description
in the words of the said Isaac Dunham himself
of his improvement in the inner burner of the Lamp
used in Light Houses.

To all to whom these Presents shall come —
Be it known that I Isaac Dunham of Bristol
in the County of Lincoln & State of Maine, Keeper
of the United States Light House at Pemaquid
in said Bristol have invented a new and useful
improvement in making or constructing the inner
burner of the Lamp used in the Light House of the
United States — and which I call Dunham's
improved inner burner of the Lamp and that the
following is a full and exact description thereof —
To the top of the inner burner of the Lamp now used
in the United States Light Houses with the spiral
groove a thin brass tube, one half inch in length and
of same bore of the burner is inserted and on this thin tube
a moveable brass ferrule three fourths of an inch
wide and one eighth of an inch which is fitted which
ferrule is removed when it becomes injured by the
burning of the Lamp wick and a new one placed
on the tube; by which improvement the burner need
not be [illegible] to be repaired as its top will never
be injured by the burning of the Lamp wick, being
protected by said ferrule and by using brass in
stead of iron for the top of the burner a better
light is obtained. What I claim as my invention
and not previously known in the above described
machine is the making and applying a moveable

6/20/1836 9746X

[illegible] ferule as before mentioned to the top of the in-
[illegible] burner of the Lamp which ferule when des-
troyed or injured by the burning [illegible] is easily removed
and its place supplied by a new one by which great
expense in repairing Light House Lamps is saved
and all delay avoided and a better light obtained.
The description by the accompanying drawing
is as follows. A the burner. B the ferule fitted on
the burner. C burner with ferule off. E. the thin
brass tube at the end of the burner. F the ferule.
In testimony whereof I the said Isaac Dunham
have hereunto set my hand this sixteenth day of
April in the year of our Lord Eighteen hundred
and thirty six.

Isaac Dunham

Witness
Wm Anderson
[illegible] Crutchane

[illegible]

(Patented June 20. 1836)

(495 words)

Drawing